United States Patent
Perras et al.

(10) Patent No.: US 9,788,252 B2
(45) Date of Patent: Oct. 10, 2017

(54) STABLE LOCAL BREAKOUT CONCEPT AND USAGE

(75) Inventors: Michelle Perras, Montreal (CA); Alexander Reznik, Titusville, NJ (US); Catherine Livet, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 118 days.

(21) Appl. No.: 14/001,290

(22) PCT Filed: Feb. 24, 2012

(86) PCT No.: PCT/US2012/026435
§ 371 (c)(1),
(2), (4) Date: Mar. 28, 2014

(87) PCT Pub. No.: WO2012/116252
PCT Pub. Date: Aug. 30, 2012

(65) Prior Publication Data
US 2014/0219242 A1    Aug. 7, 2014

Related U.S. Application Data

(60) Provisional application No. 61/446,343, filed on Feb. 24, 2011.

(51) Int. Cl.
*H04W 36/22* (2009.01)
*H04W 8/08* (2009.01)
(Continued)

(52) U.S. Cl.
CPC .......... *H04W 36/22* (2013.01); *H04W 8/082* (2013.01); *H04W 84/12* (2013.01); *H04W 8/26* (2013.01); *H04W 28/08* (2013.01); *H04W 80/04* (2013.01)

(58) Field of Classification Search
CPC ............. H04W 88/06; H04W 36/0011; H04M 15/8033; H04B 7/022
See application file for complete search history.

(56) References Cited

U.S. PATENT DOCUMENTS 8,743,887 B2    6/2014  Balasubramanian et al.
8,774,039 B2    7/2014  Hirano et al.
(Continued)

FOREIGN PATENT DOCUMENTS

CN    101577678 A    11/2009
EP    2117201 A1    11/2009
(Continued)

OTHER PUBLICATIONS

Zhao et al. "Flexible Network Support for Mobile Hosts", Mobile Networks and Applications, vol. 6, Issue 2, Mar. 1, 2001, 19 pages.
(Continued)

*Primary Examiner* — Jackie Zuniga Abad
(74) *Attorney, Agent, or Firm* — Condo Roccia Koptiw LLP

(57) ABSTRACT

Systems and methods are provided for routing internet protocol (IP) traffic flows when connected to a mobile network and a local network. A wireless transmit and receive unit (WTRU) determines whether to offload an IP traffic flow from the mobile network to the local network based on the destination address of the IP traffic flow. When the destination address is local, the WTRU routes the IP traffic flow through local network. The WTRU determines whether to offload IP traffic to the local network based on the stability state of the local network When the local network connection is sufficiently stable for the application associated with the IP traffic, the IP traffic is offloaded to the local network by selecting the local IP address as the source IP address.

14 Claims, 10 Drawing Sheets

(51) Int. Cl.
*H04W 84/12* (2009.01)
*H04W 8/26* (2009.01)
*H04W 28/08* (2009.01)
*H04W 80/04* (2009.01)

(56) References Cited

U.S. PATENT DOCUMENTS

| | | |
|---|---|---|
| 2004/0208153 A1 | 10/2004 | Mizell et al. |
| 2006/0217112 A1* | 9/2006 | Mo .................. H04W 36/14 455/422.1 |
| 2009/0268668 A1 | 10/2009 | Tinnakornsrisuphap et al. |
| 2009/0279522 A1 | 11/2009 | Leroy et al. |

FOREIGN PATENT DOCUMENTS

| | | |
|---|---|---|
| JP | 2006-521715 A | 9/2006 |
| JP | 2010-028774 A | 2/2010 |
| JP | 2011-501516 A | 1/2011 |
| JP | 2011-519537 A | 7/2011 |
| KR | 10-2011-0007613 A | 1/2011 |
| KR | 10-2011-0008270 A | 1/2011 |
| WO | WO 2004/086681 A2 | 10/2004 |
| WO | WO 2008/060208 A1 | 5/2008 |
| WO | WO 2009/132139 A1 | 10/2009 |
| WO | WO 2010/039084 A1 | 4/2010 |
| WO | WO 2010/146816 A1 | 12/2010 |

OTHER PUBLICATIONS

Melia et al., "Logical Interface Support for multi-mode IP Hosts, draft-melia-netext-logical-interface-support-01", Oct. 24, 2010, 17 pages.

3rd Generation Partnership Project (3GPP), TS 23.402 v10.1.0, "Technical Specification Group Services and System Aspects; Architecture enhancements for non-3GPP accesses (Release 10)" Sep. 2010, 1-227.

3rd Generation Partnership Project (3GPP), TS 23.261 v10.0.0, "IP Specification Group Services and System Aspects; IP Flow Mobility and Seamless Wirless Local Area Network (WLAN) Offload; Stage 2 (Release 10)", Jun. 2010, 1-20.

Zhao et al., "Flexible Network Support for Mobility", Proceedings of the 4th annual ACM/IEEE International Conference on Mobile Computing and Networking, 1998, pp. 145-156.

* cited by examiner

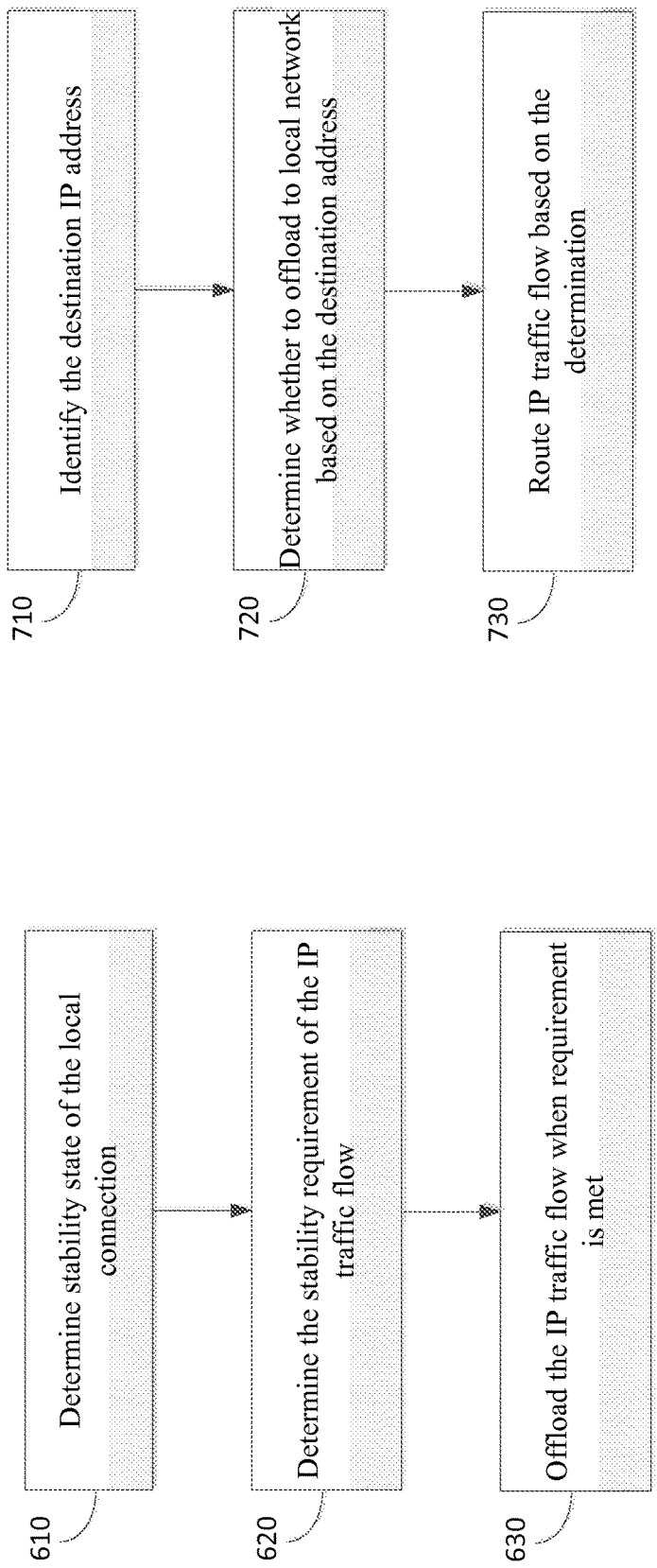

STABLE LOCAL BREAKOUT CONCEPT AND USAGE

CROSS-REFERENCE TO RELATED APPLICATIONS

This application is the National Stage Entry under 35 U.S.C. §371 of Patent Cooperation Treaty Application No. PCT/US2012/026435, filed Feb. 24, 2012, which claims the benefit of U.S. Provisional Application No. 61/446,343, filed Feb. 24, 2011, which is hereby incorporated by reference herein.

BACKGROUND

A mobile device may simultaneously connect to a cellular network and a wireless local network (WLAN) and exchange IP flows belonging to the same Public Data Networks (PDN) connection through different accesses. The operator may indicate how the IP flows may be routed through the available access systems, and may selectively offload some traffic to WLAN while using UTRAN or E-UTRAN for other traffic. This may be referred to as WLAN offload.

WLAN offload may be seamless or non-seamless. When WLAN offload is seamless, IP traffic flows belonging to the same or different applications may be moved seamlessly between a 3rd Generation Partnership Project (3GPP) access and WLAN. When WLAN offload is non-seamless, the local IP address changes each time the mobile device changes its location and connects to a different access point. The data session may need to be re-established, and the correspondent node may need to learn the new local IP address for the data exchange to resume.

Currently, certain services such as mobility services may require or prefer to use seamless WLAN offload. Mobility services may include, but not be limited to, voice over IP (VoIP), inter-technology handover (HO), IP flow mobility (IFOM), and/or bandwidth aggregation (BWA). Applications such as VoIP application and video streaming application may require mobility services. While it may be less costly and faster for the mobile device to use the local connection than using mobile network connections, mobility demanding applications may be forced to use mobile network connections even when the mobile device is substantially stationary.

SUMMARY

Systems and methods for routing internet protocol (IP) traffic flows when connected to a mobile network and a local network stable local breakout are disclosed. According to an aspect, a method includes a wireless transmit and receive unit (WTRU) determining whether to offload the IP traffic flow from the mobile network to the local network based on the destination address of the IP traffic flow. According to an aspect, a method includes offloading the IP traffic flow to the local network when the local network connection is sufficiently stable.

In an embodiment, the destination address of the IP traffic flow may be identified. Whether to offload the IP traffic flow from the mobile network to the local network may be determined based on the destination address. For example, a filter rule may indicate that traffic shall be non-seamlessly offloaded to the local network when the destination address is local. When the destination address is local, for example, the WTRU is to communicate to a correspondence node in the same local network, the IP flows may be routed through the local access point. A local IP address allocated by the local network may be acquired and used for sending the IP traffic flow. For example, when the destination address is not part of the local network, the IP traffic flow may be routed through the mobile network.

In an embodiment, whether to offload an IP traffic flow to the local network may be determined based on the stability state of the local network. For example, the stability of the local connection may be determined based on whether the local network connection is expected to be available to the WTRU for a predetermined period of time. The stability state may be preconfigured or input by the user or the network operator. The stability state may be heuristically identified. When the stability state of the local network connection meets the stability requirement associated with the IP traffic flow, the IP traffic flow may offloaded to the local network by selecting the local IP address as source IP address.

The local network connection may serve as a local breakout connection. When a local breakout connection is in a stable state, mobility services and applications may be directed to use the local breakout connection. Mobility services and applications that may require seamless MILAN offload and would normally use a mobile connection may use the local breakout connection. A source IP address may be selected when local breakout connection(s) are to be used.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF TILE DRAWINGS

A more detailed understanding may be had from the following description, given by way of example in conjunction with the accompanying drawings.

FIG. 6 illustrates an example method for routing IP traffic in a local breakout session.

FIG. 7 illustrates an example method for routing IP traffic in a local breakout session.

DETAILED DESCRIPTION OF ILLUSTRATIVE EMBODIMENTS

Figure 1A:
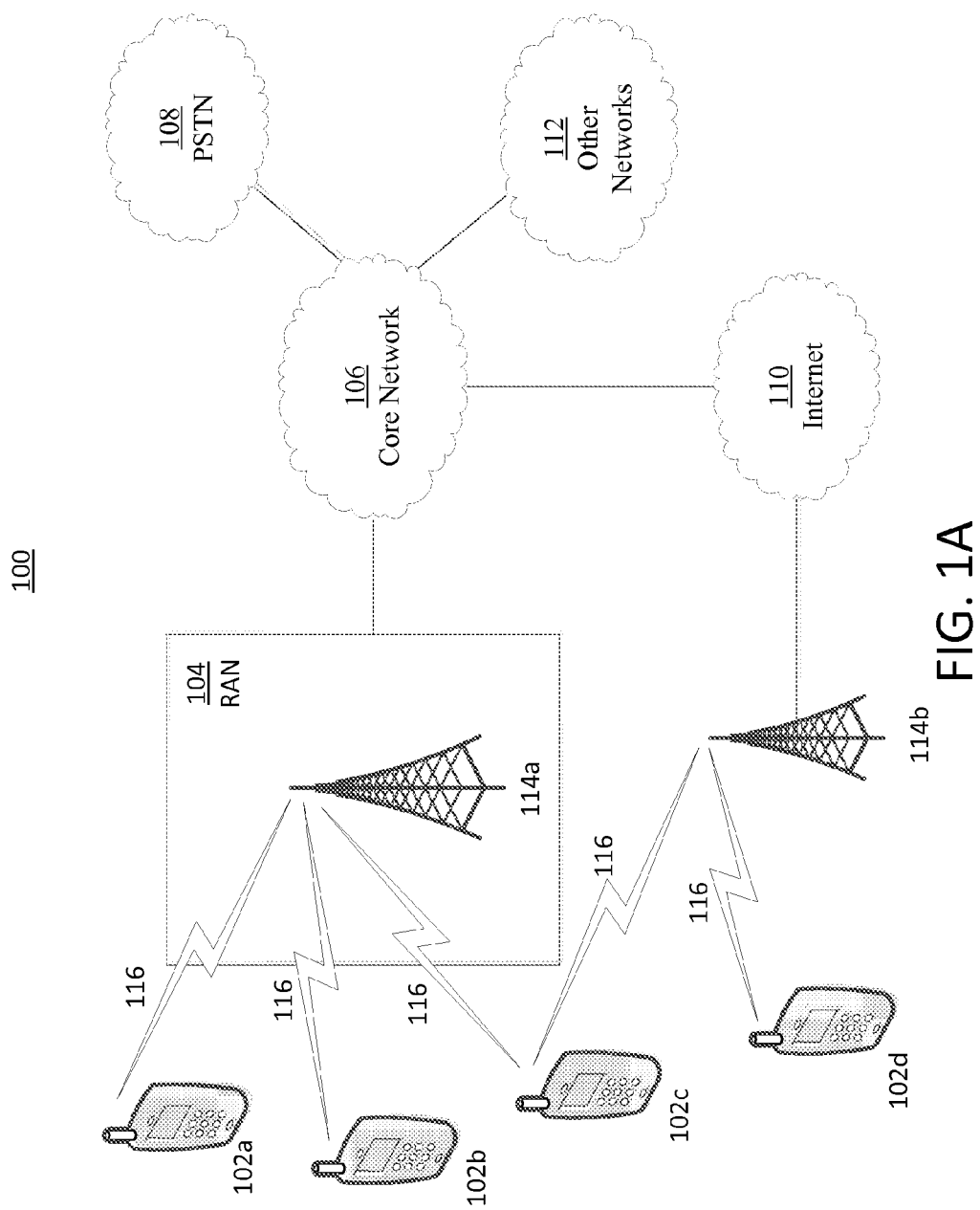
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a, and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a, may be part of the RAN 104, which may also include other base stations and/or network elements (not shown), such as a base station controller (BSC), a radio network controller (RNC), relay nodes, etc. The base station 114a, and/or the base station 114b may be configured to transmit and/or receive wireless signals within a particular geographic region, which may be referred to as a cell (not shown). The cell may further be divided into cell sectors. For example, the cell associated with the base station 114a, may be divided into three sectors. Thus, in an embodiment, the base station 114a, may include three transceivers, i.e., one for each sector of the cell. In another embodiment, the base station 114a, may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a, and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a, and the WTRUs 102a, 102b, 102c may implement radio technologies such as IEEE 802.16 (i.e., Worldwide interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or AP, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDM2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The core network 106 may include at least one transceiver and at least one processor. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
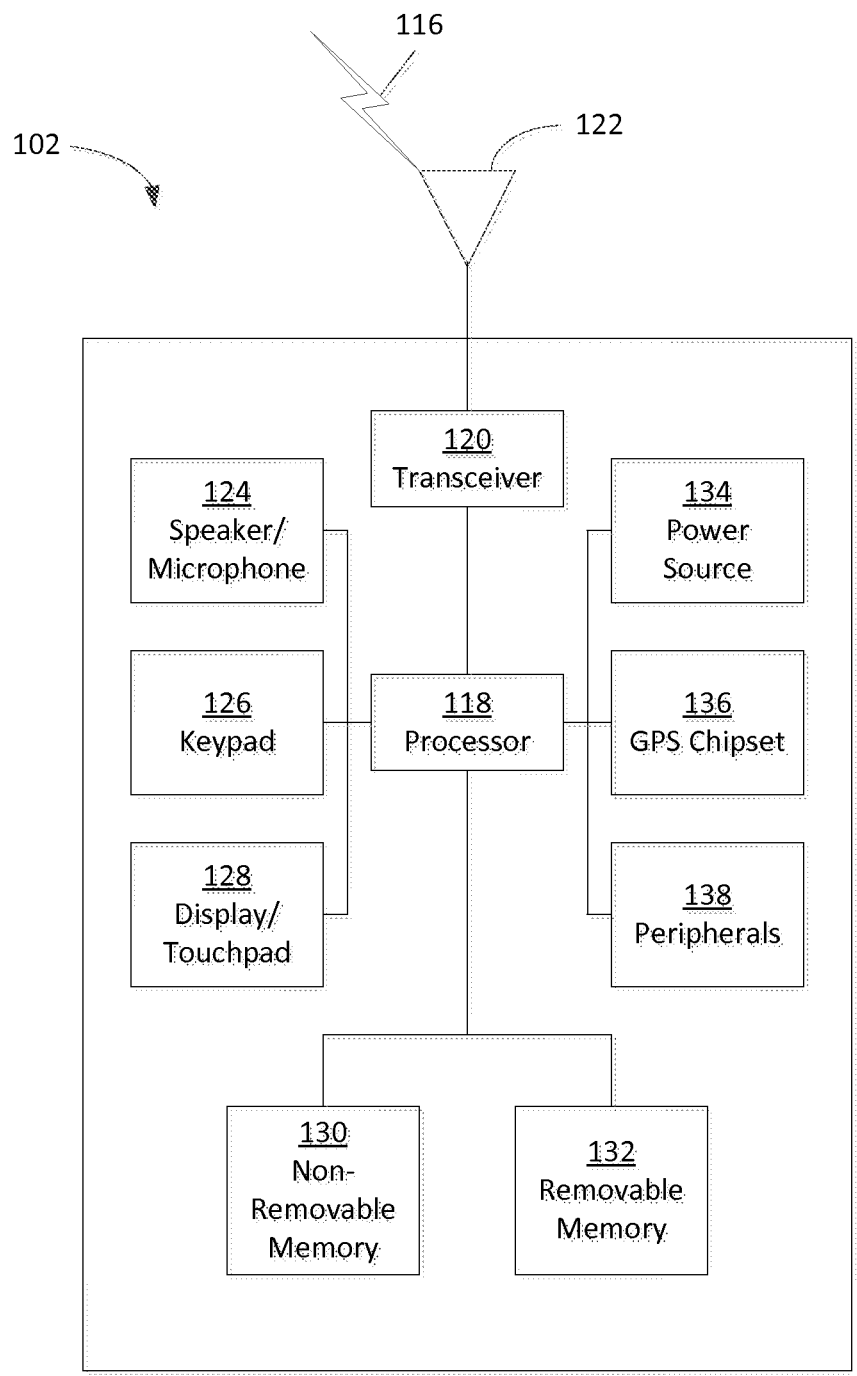
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, abuse station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example, In yet another embodiment, the transmit/receive element 122 may be configured to transmit and receive both RF and light signals. It will be appreciated that the transmit/receive element 122 may be configured to transmit and/or receive any combination of wireless signals. In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 anchor the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to ether peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
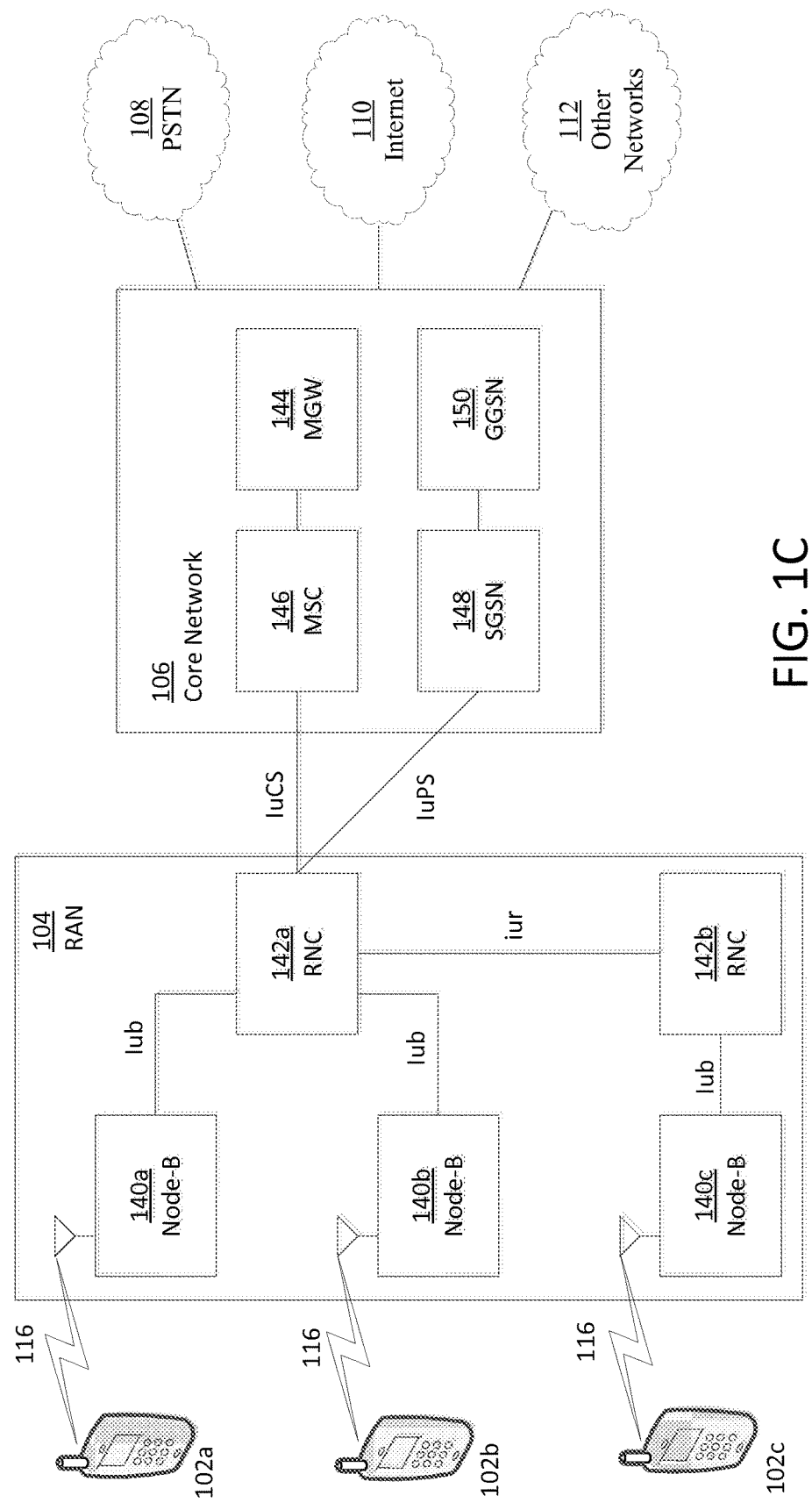
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a, in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a, in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
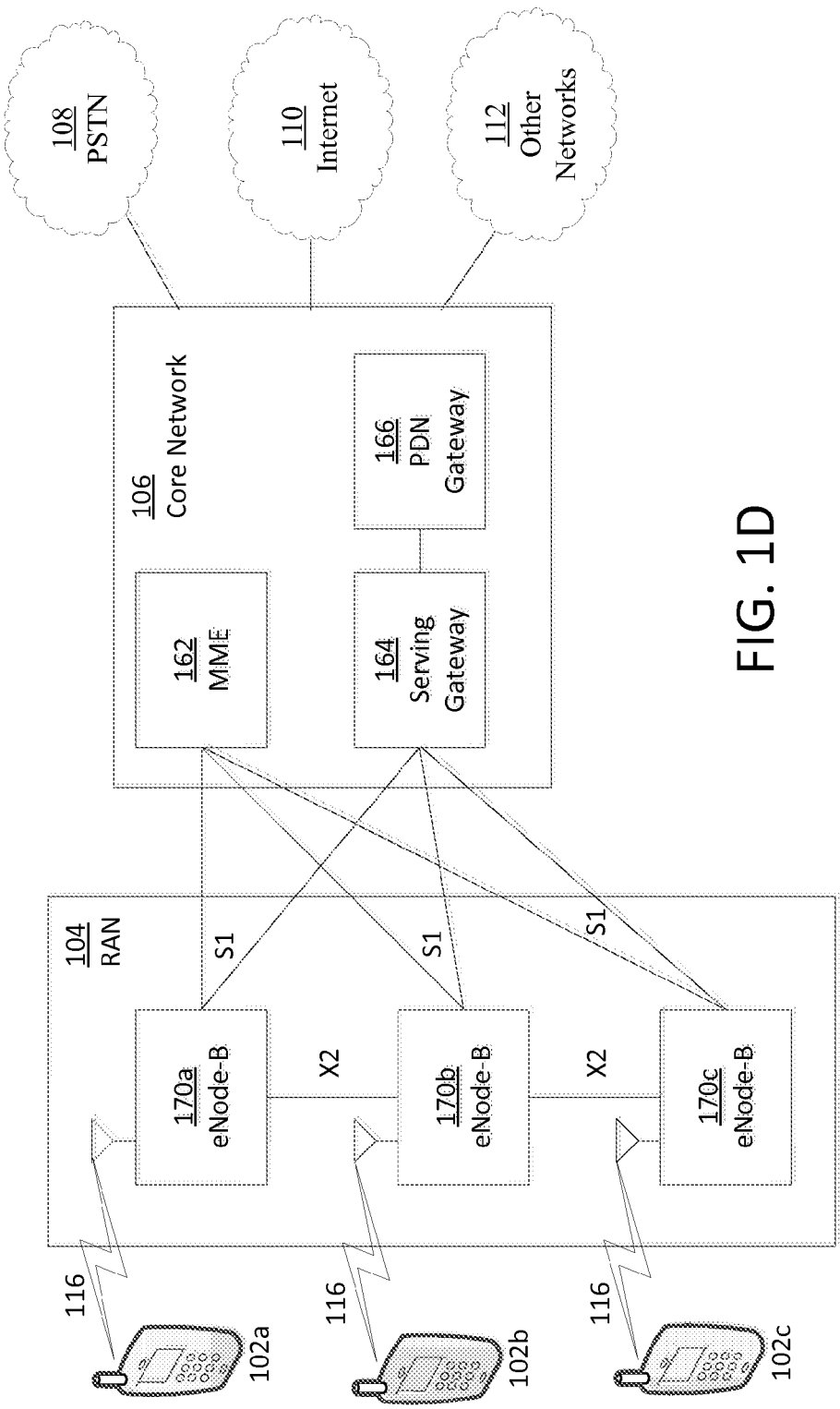
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b and 102c over the air interface 116. The RAN 104 may also be in communication with the core network 106.

The RAN 104 may include eNode-Bs 170a, 170b and 170c, though it will be appreciated that the RAN 104 may include any number of eNode-Bs while remaining consistent with an embodiment. The eNode-Bs 170a, 170b, 170c may each include one or more transceivers for communicating with the WTRUs 102a, 102b, 102c over the air interface 116. In an embodiment, the eNode-Bs 170a, 170b, 170c may implement MIMO technology. Thus, the eNode-B 140a, for example, may use multiple antennas to transmit wireless signals to, and receive wireless signals from, the WTRU 102a.

Each of the eNode-Bs 170a, 170b and 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network (CN) 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 170a, 170b and 170c in the RAN 104 via an S1 interface and may serve as a control node. For example, the MME 162 may be responsible for authenticating users of the WTRUs 102a, 102b, 102c, bearer activation/deactivation, selecting a particular serving gateway during au initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 170a, 170b, 170c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
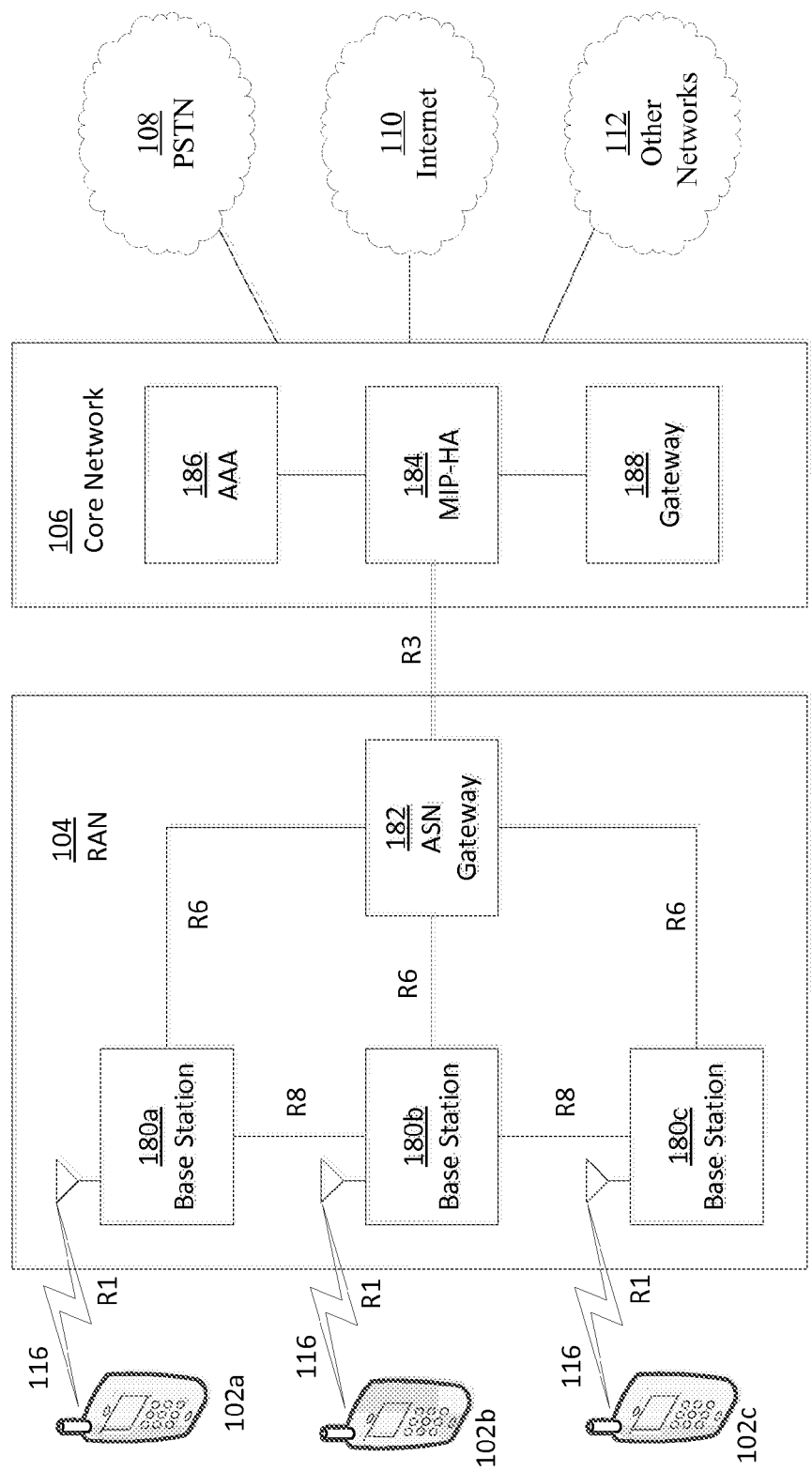
FIG. 1E is a system diagram of an example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 180a, 180b, 180c, and an ASN gateway 142, though it will be appreciated that the RAN 104 may include any number of base stations and ASN gateways while remaining consistent with an embodiment. The base stations 180a, 180b, 180c may each be associated with a particular cell (not shown) in the RAN 104 and may each include one or more transceivers for communicating with the WTRUs 102a, 102b, 102c over the air interface 116. In one embodiment, the base stations 180a, 180b, 180c may implement MIMO technology. Thus, the base station 140a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

Figure 2:
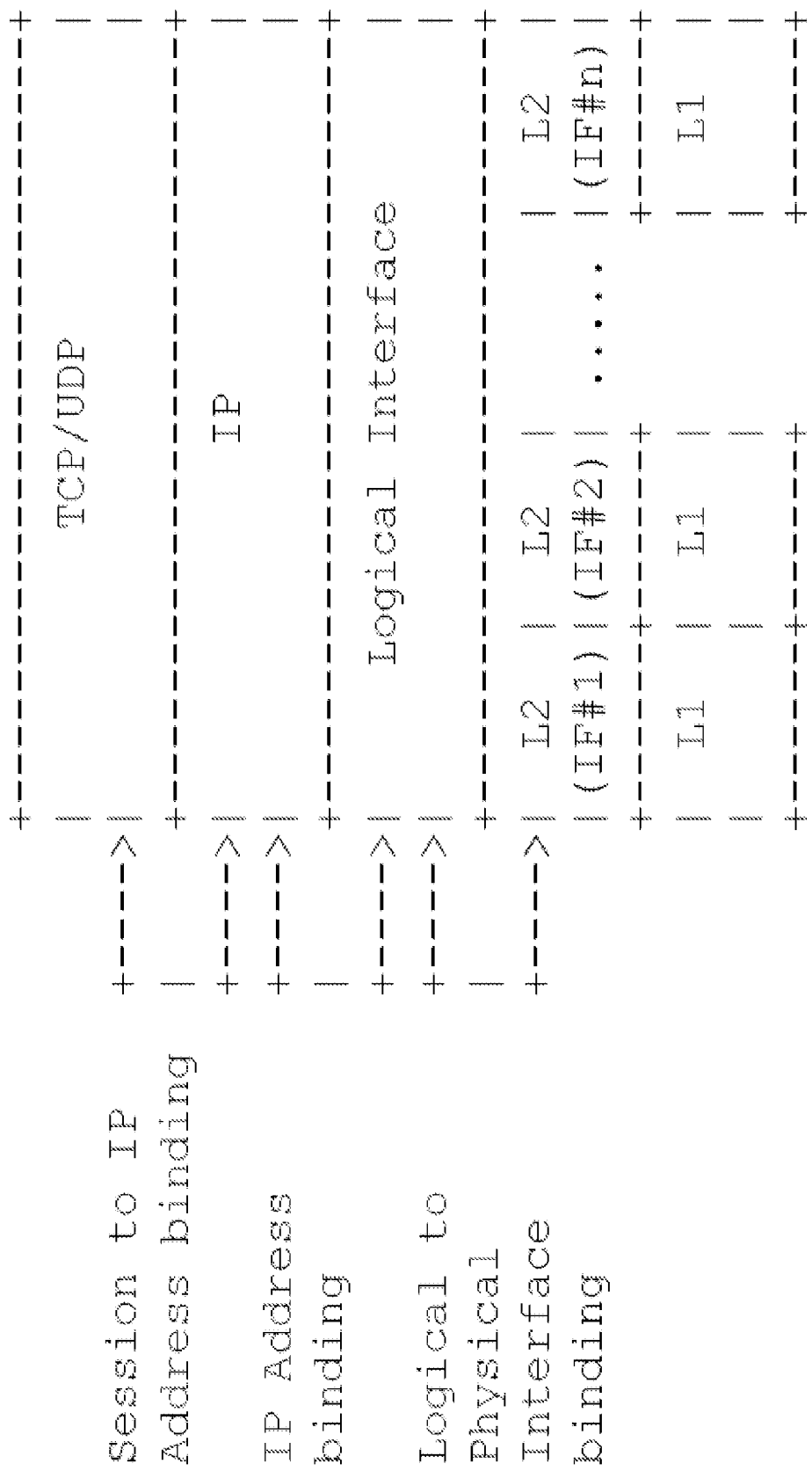
FIG. 2 is an example logical interface implementation on a mobile network.

An Internet Protocol (IP) stack may be referred to as a software implementation of the IP suite. A logical interface (UE) may refer to a construct internal to an operating system. In an LIF implementation, the link-layer may hide the physical interfaces from the IP stack and from network nodes. A LIF may allow the mobile node to provide a single interface view to the layers above W. Upper layers may bind to the LIF, which may hide inner inter-access technology handovers or data flow transfers among different physical interfaces. An example of a logical interface implementation on a mobile network is illustrated by the diagram of FIG. 2.

Physical interfaces may be assigned a unique set of home network prefixes (HNPs) or a shared set of network prefixes. The LIF may be associated to HNPs that may be moved between interfaces transparently to the upper layers (e.g., IP and above). The LIF technique may support simultaneous attachment, in addition to sequential attachment. In an embodiment, a physical interface capable of attaching to a mobile access gateway (MAG) may include an IP interface. Multiple physical interfaces may be grouped under the same IP logical interface.

Network-based IP flow mobility (IFOM) may initiate when the anchor decides to move a particular flow from its default path to a different path. The anchor may determine the access gateway for forwarding a particular flow when the flow is initiated. For example, the anchor may determine the access gateway based on application policy profiles and/or during the lifetime of the flow upon receiving a network-based or a mobile-based trigger.

A WTRU supporting cellular radio access as well as local network access such as wireless local area network (WLAN) radio access may use local breakout technology to route IP traffic. For example, a WTRU may, while connected to a WLAN, route specific IP flows via the WLAN access without traversing the Evolved Packet Core (EPC). The EPC may be part of a mobile network or cellular radio access. The WTRU may be directed or indirectly connected to the local network. The WTRU may be connected to the local network via an access point, through a gateway, through another network, or the like. The connection may be wired or wireless. By routing certain IP flows through the WLAN, local breakout may offload IP traffic from the EPC. IP flows to be routed through the WLAN access may be identified via user preferences, local operating environment information, and or via policies that may be statically pre-configured by the operator on the WTRU, or dynamically set by the Operator via the access network discovery and selection function (ANDSF). The WTRU may use different IP addresses based on the access technology being used. Such offload may be referred to as non-seamless WLAN offload.

In an embodiment, when the WLAN access is EPC connected, the WTRU may simultaneously perform seamless WLAN offload for some IP flows and non-seamless WLAN offload for some IP flows.

The WTRU may use different IP addresses when connected to the mobile network and the WLAN network. For example, specific IP flows may use a mobile IP address allocated by the mobile network, and specific IP flows may use a local IP address allocated by the WEAN access network. Specifically, the local IP address may be used for the IP flows identified to be routed through the local network, and the mobile IP address may be used for the IP flows to be routed through the EPC. The WTRU may acquire the local IP address on WLAN access. The local IP address may be obtained by a local Dynamic Host Configuration Protocol (DHCP) server.

FIG. 6 illustrates an example method for routing IP traffic in a local breakout session. At 610, the stability state of the local network connection may be determined. The stability state may describe whether the connection has been and/or is likely to remain available to the WTRU for a predetermined period of time. In an embodiment, the ability state may describe whether the WTRU has been connected to and/or is expected to stay connected to the connection for a predetermined period of time.

In an embodiment, a local breakout connection may be in a stability state when the local connection is expected to be available to the WTRU for a predetermined period of time. In an embodiment, a local breakout connection may be in a stability state when the local IP address of the WTRU is expected to be available to the WTRU for a predetermined period of time. The predetermined period time may include a substantially long period, such as 5 minutes, 10 minutes, 30 minutes, 60 minutes, 90 minutes and the like. The predetermined time period may be preconfigured, dynamically set, or semi-dynamically set. The predetermined time period may be referred to as a stability threshold.

One or more stability thresholds may also be configured. For example, a stability threshold may represent the minimal duration for a connection needs to be established before being considered stable. In an embodiment, a local connection may be considered stable after the connection is available to the WTRU for a predetermined duration with no or minimal interruptions.

In an embodiment, stability state may be categorized into sub-states. For example, a connection may be in low stability state, medium stability state, or high stability state. Different stabilities thresholds may apply to different sub-states. For example, the stability threshold for a high stability state may be higher than the stability thresholds for low and medium stability states. Table 1 shows an example stability threshold configuration.

TABLE 1

Example Stability State Thresholds Configuration

| Configuration Items | Configured values (connected since at least) |
|---|---|
| Stability threshold (high) | 90 minutes |
| Stability threshold (med) | 60 minutes |
| Stability threshold (low) | 30 minutes |

In an embodiment, the local breakout connection may be determined to be in a stable state if the local breakout connection is identified as a stable connection. For example, the WTRU may maintain a list of local connections. Certain local connections may be identified as stable connections. In an embodiment, a user profile may contain access point (AP) identifiers known to be "stable." For example, the WTRU user's home AP may be listed as a stable connection, as the user typically stays at home for a long period of time. For example, the WTRU user's work or office AP may be hated as a stable connection, as the user is expected to stay at work and thereby connect the WTRU to the office AP for a long period of time.

The local breakout connection may be determined to be in a stable state during a predetermined time frame. A local connection or AP may be associated with one or more expected stability periods. An expected stability period may include the day and/or expected duration during which local connection or AP may be available to the WTRU, and/or the WTRU may be expected to connect to the local connection or AP and stay substantially stationary. In an embodiment, the expected stability period(s) may be stored in the user profile associated with the WTRU. For example, the profile may identify a local connection to the home AP as being stable between 6:00 PM to 7:00 AM from Monday to Friday.

In an embodiment, the stability period for a local connection or AP may be heuristically identified. A local connection may be monitored and cumulative statistics about the AP usage over time may be kept. The ability period for the local connection or AP may be derived based on the time and duration of when the WTRUA is connected to the local connection or AP.

Stability information associated with one or more local connections or APs that the WTRU may access may be tracked. The stability information may be stored locally or remotely. For example, stability information may be stored in any type of suitable memory, such as the non-removable memory 106 and/or the removable memory 132. Stability information may be tracked and/or stored remotely, such as via a remote server.

Table 2 shows an example stability table with example stability information. As shown, an AP may be assigned with an AP identifier that may uniquely identify an AP that the WTRU may connect to. Expected stability period(s) may be tracked and stored for each AP. In an embodiment, the expected stability period may include configured period(s) and/or derived period(s). Configured period(s) may be entered by the user. Derived period(s) for a local connection or AP may be derived or learned based on cumulative usage statistics over time as described above. For example, as shown below, if the WTRU is connected to the local connection or AP associated with the "FriendID" from 9:00 PM to 12:00 PM on Fridays, the stability information may include that time period as a derived expected stability period.

TABLE 2

Example Stability Table

| AP Identifier | Home ID | Office ID | Friend ID |
|---|---|---|---|
| Expected Stability Period (configured) | MON-FRI/ 6:00 PM to 7:00 AM | MON-FRI/ 8:00 AM to 5:00 PM | unknown |
| Expected Stability Period (derived) | | | FRIDAY 9:00 PM to 12:00 PM |
| Current State (calculated) | Stable (med) | Not connected | Not connected |
| Connection time (connected since) | 65 minutes | n/a | n/a |
| Historical Values/Statistics (to derive Expected Stability Periods) | | | 1) Friday last week, from 8:55 PM, for 3 hours 2) Friday 2 weeks ago, from 9:10 PM, for 3½ hours |

As shown in Table 2, stability information tray include an indication of the current stability state. For example, potential values for the current stability state may include, but not limited to, stable (high), stable (medium), stable (low), unknown, and not connected. If the WTRU is presently connected to a local connection or AP, the stability information may also include an indication of connection time. As shown, stability information may include historical stability information and/or statistics, such as the date, time and/or duration of previous connection session(s). For example, historical statics for the local connection or AP associated with the "FriendID" may include connected from 8:55 PM for 3 hours on last Friday, and connected from 9:10 PM for 3½ hours on Friday 2 weeks ago. Based on the historical statistics, a stability period of 9:00 PM to 12:00 PM on Fridays may be derived.

In an embodiment, a local connection may be identified as being stable using a global positioning system (GPS). For example, if the WTRU is substantially stationary, or does not move for a predetermined period of time, it may be determined that the local connection is stable.

Referring to FIG. 6, at 620, the stability requirement associated with the IP traffic flow may be determined. In an embodiment, an application or mobile service may be associated with stability requirement, such as requires stability, or does not require stability. For example, an application requiring stability may use the local network if the local network is determined to be stable, and may use the cellular network if the local connection is determined to unstable. In an embodiment, an application or mobile service may be associated with a stability requirement, such as low, medium or high. For example, an application requiring medium stability may use the local connection provided the local connection is in a high or medium stability state. For example, a mobile service requiring high stability may not use the location connection if the connection is in a low or medium stability state.

At 630, the IP traffic flow may be offloaded to the local network when the stability state of the local network connection meets the stability requirement of the IP traffic flow. IP traffic flow may be routed through the stable local breakout connection. For example, a local IP address may be allocated by the local network. When it is determined to offload the IP traffic flow, the local IP address may be used for sending the IP traffic flow.

Figure 3:
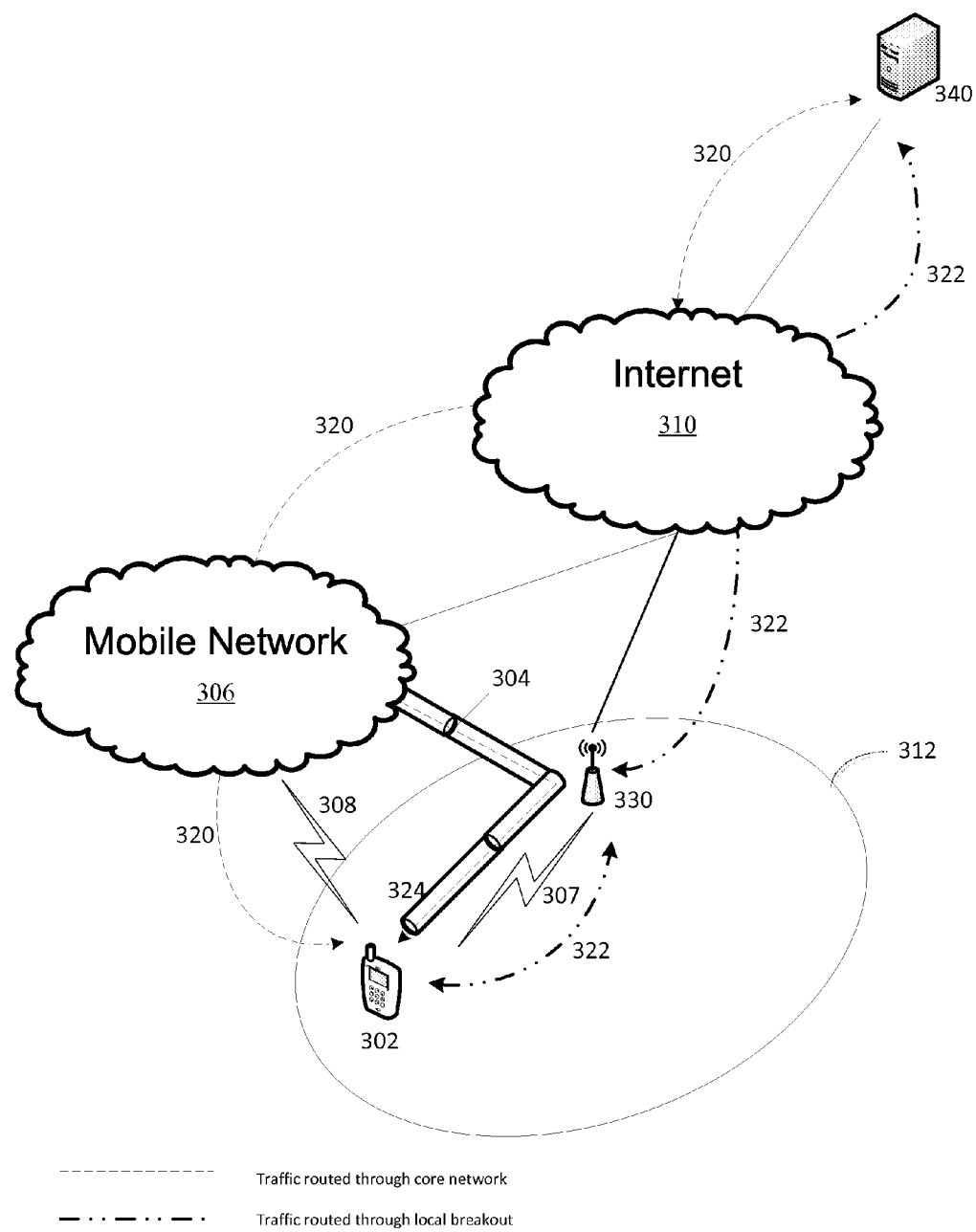
FIG. 3 illustrates example traffic going through a stable local breakout session.

FIG. 3 illustrates a diagram of example traffic going through a stable local breakout session. As shown, a WTRU 302 may be connected to mobile network 306 via a cellular radio connection 308 and/or via the WLAN connection tunneled to the mobile network 306. The WTRU 302 may also be connected to AP 330 via a local wireless connection 307. The AP 330 may belong to local network or WLAN 312. As shown, IP flows 320 between the WTRU 302 and the correspondent node 340 may be routed via the cellular radio connection 308, the mobile network 306, and the Internet 310. IP flows 322 between the WTRU 302 and the correspondence node 340 may be routed via the local wireless connection 307 and the AP 330. By routing IP flows 322 through the WLAN 312, local breakout may offload traffic from the mobile core network.

In an embodiment, a tunnel 304 may be established for the WTRU 302 to access the mobile network 306. As shown in FIG. 3, IP flows 324 between the WTRU 302 and the correspondent node 340 may be routed via tunnel 304, the mobile network 306, and the Internet 310. The tunnel may serve as a WLAN interface between the WTRU 302 and the mobile network 306/EPC. The WLAN interface may have an EPC IP address and a local IP address allocated by the local DHCP server. When the EPC IP address is used to send IP flows through the WLAN, the packets associates with the IP flows may be tunneled to the EPC. The local IP address may be used to bypass the EPC.

Based on a determination that the local connection is in a stable state, applications may be used over a local breakout connection. IP flows related to mobility demanding applications may be routed via the local wireless connection 307 and the AP 330. Broadband wireless access (BWA) based on peer-to-peer concept such as Multipath Transmission Control Protocol (MPTCP) may be used when connected to local breakout connection.

In an embodiment, an IP traffic flow requiring mobility services may be routed through the mobile core network. In an embodiment, when the destination of the traffic flow is local, the traffic flows may stay on the local network instead of being routed through the mobile core network. It may be beneficial to keep local traffic in the local network because transmission may be faster than going through the mobile core network, the costs to the user may be lower, and traffic may be off loaded from the mobile core network.

FIG. 7 illustrates an example method for routing IP traffic in a local breakout session. At 710, the destination address of an IP traffic flow may be identified. At 720, whether to offload the IP traffic flow from the cellular network to the local network may be determined based on the destination address of the IP traffic flow. The destination address may be compared to addresses associated with the local network. For example, a filter rule may identify traffic based on the destination address. If the destination address is part of the addresses associated with the local network, the filter rule may indicate that the IP traffic may be offloaded to the local network. In an embodiment, when the destination address is local, the IP traffic may be kept inside of the local network even when mobility services are required. At 730, the IP traffic flow may be routed based on the determination. For example, a local IP address may be allocated by the local network. When it is determined to offload the IP traffic flow, the local IP address may be used for sending the IP traffic flow. For example, when the destination address is determined to be local, the local IP address may be assigned as the source IP address, and the IP traffic flow may be routed through the local network.

Figure 4:
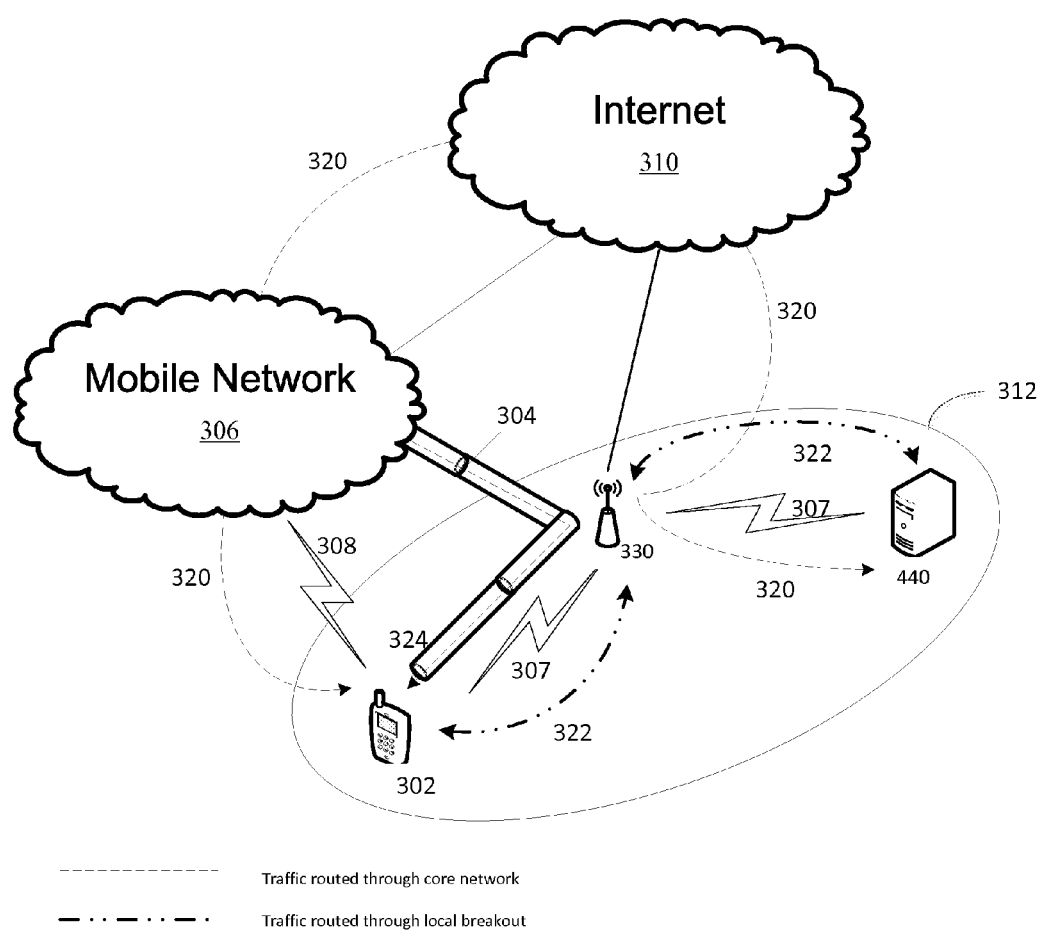
FIG. 4 illustrates local traffic going through local breakout.

FIG. 4 illustrates a diagram of example local traffic going through local breakout. Referring to FIG. 4, a WTRU 302 may be connected to core network 306 via a cellular radio connection 308 and via a WLAN connection 304. The WTRU 302 may also be connected to AP 330 via a local wireless connection 307. The correspondent node 440 may also be connected to AP 330 via a local wireless connection 307. The AP 330 may be connected to local network or WLAN 312.

In an embodiment, a tunnel 304 may be established for the WTRU 302 to access the mobile network 306. As shown in FIG. 3, IP flows 324 between the WTRU 302 and the correspondent node 340 may be routed via tunnel 304, the mobile network 306, and the Internet 310. The tunnel may serve as a WLAN interface between the WTRU 302 and the mobile network 306/EPC. The WLAN interface may have an EPC IP address and a local IP address allocated by the local DHCP server. When the EPC IP address is used to send IP flows through the WLAN, the packets associates with the IP flows may be tunneled to the EPC. The local IP address may be used to bypass the EPC. For example, when the destination IP address is from EPC, a packet sent through WLAN may be tunneled to the EPC. When the destination IP address is local, a packet may be sent locally bypassing the EPC.

As shown in FIG. 4, the correspondence node 440 is connected to the local network 312. The local network 312 may include an enterprise network, or a user home network an AP with a relatively stable IP address. IP flows 320 and 322 between the WTRU 302 and the correspondent node 440 may require mobility services. In an embodiment, the IP flows 320 may be routed via the cellular radio connection 308, the mobile network 306, and the Internet 310. The IP flows 320 may be routed via the WLAN connection 304, the core network 306, and the Internet 310. In an embodiment, based on a determination that the correspondence node 440 is connected to the same local network, the WTRU 302 may route the IP flows 322 to the correspondence node 440 via the local wireless connection 307 and the AP 330. By routing IP flows 322 through the WLAN 312, local breakout may offload traffic from the mobile core network.

The WTRU 302 may correspond to or include the WTRU 102 described above respect to FIGS. 1A-ID. The mobile network 306 may correspond to or include the core network 106 described above with respect to FIGS. 1A, 1C and 1D.

The Internet 310 may correspond to or include the Internet 110 described above with respect to FIGS. 1A, 1C and 1D. While the AP 330 shown in FIGS. 3 and 4 is a wireless AP any non-cellular AP may be used.

An example procedure for determining whether and when to use a local breakout connection or the local network is described below. The decision may take into account the stability state of the local breakout connection. Depending on the determination, mobility demanding applications may use stable local breakout connections. Local traffic may be kept within the local network instead of going through the mobile core network. For example, IP traffic between two devices connected to the user's home network may be routed within the user's home network. The local breakout connection may be selected, for example, when the traffic requires low-speed or low-QoS traffic.

In an embodiment, the local breakout connection may not be used when mobility services such as flow mobility are required. The local breakout connection may use a locally assigned IP address that may change each time the WTRU moves to new location. The change of IP address may interrupt the connectivity with a remote peer. For example, if a WTRU starts a voice over IP connection with a remote peer and the user is moving, the local IP address of the WTRU may change continuously. A mobile IP address allocated by the core network may be used to maintain the VoIP connection. In an embodiment, the local breakout connection may be used when even mobility services are required.

In an embodiment, whether IP flows may be routed through the local breakout connection may be determined based on one or more policies. For example, whether IP traffic may be offloaded to WLAN may be determined via a filter rule of the inter-system mobility policy and/or inter-system routing policy.

Inter-system mobility policy and/or inter-system routing policy may include policies for routing IP traffic simultaneously over multiple radio access interfaces. The policy may be set up to per the operator's routing preferences and/or mobile network offload preferences. The WTRU may use the policy to determine when the local breakout connection is restricted for a specific IP traffic flow, and/or select the access technology or network for routing the IP traffic flow. For example, the policy may be set by, for example but not limited to, the mobile network operator, the operator of the WTRU, an application or service provider, and/or the local network administrator.

IP flow class specific policies may enable the operator to indicate to the WTRU through which access technology IP flows are to be routed. Such policies may be defined per AP, per IP flow class, or per IP flow class under a specific AP. For IP flows that are routed over WLAN, the IP flow class specific policies may specify whether the traffic may be routed through the home agent (HA) or directly via the WLAN access, bypassing the HA.

For example, the policy may limit local breakout sessions to use a subset of the available stable local connections. The policy may specify that certain connections may be preferable to others when multiple stable local connections are available to the WTRU. The policy may specify what type(s) of mobility services a local connection may or may not support.

When the WTRU is connected to the cellular/mobile network and the local network the WTRU may be configured with different addresses on the accesses. The local IP address may be assigned as the source IP address, and outgoing traffic may be routed through the local connection. Whether to assign the local IP address as the source IP address may be determined based on policies, destination IP address, whether the available local breakout connection(s) is in a stable state, radio environment information, quality of IP connection, service-specific requirements, application-specific requirements and/or the available cellular connections. For example, a local IP address may be assigned if the local connection is determined to be sufficiently stable for the application needs. A mobile IP address may otherwise be assigned, and traffic may be routed through the core network. To illustrate, BWA service may require the location connection to be in a high stability state to route related IP flows through the local connection. If the local connection is in a low or medium stability state or IP flows related to the BWA service, or IP flows related to applications that require BWA service, may be routed through the core network. If multiple mobile connections exist, the choice of mobile connection may depend on, for example, policies, user preference, congestion, and the like.

Figure 5:
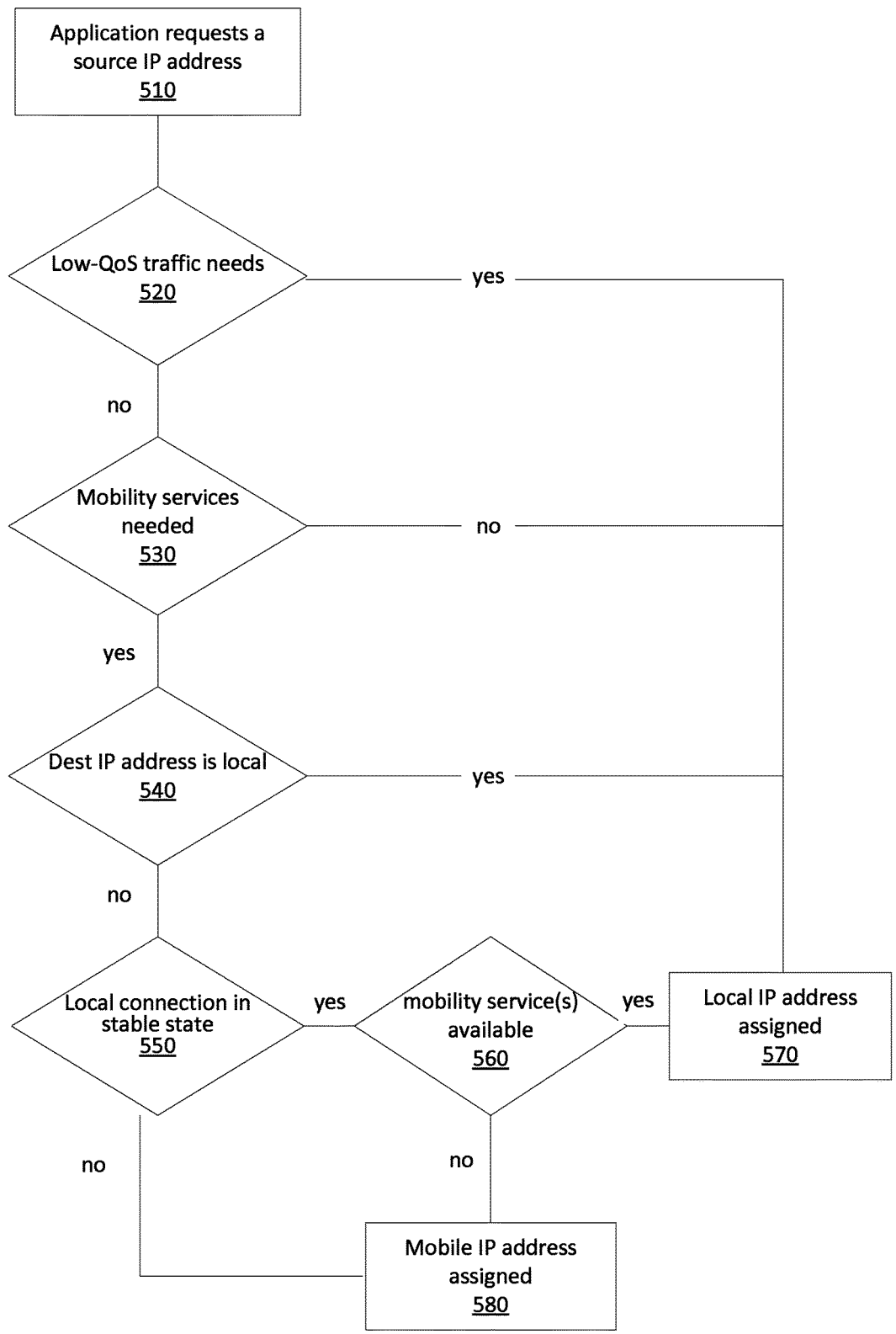
FIG. 5 shows an example process for selecting a source IP address during a local breakout session.

FIG. 5 shows an example process for selecting a source IP address during a local breakout session. While the example process is described in the context of outgoing traffic and selecting a source IP address, it should be understood that selecting a destination IP address for incoming traffic may follow the same process.

As shown, at 510, an application may request a source IP address. For example, the application may use the source IP address to communicate with a correspondent node, such as correspondent node 340 in FIG. 3 or correspondent node 440 in FIG. 4. At 520, whether the application may function with a low-speed or low quality of service (QoS) connection may be determined. In an example, where the application is content with low-speed or low-QoS connection, at 570, a local IP address may be assigned as a source IP address, and outgoing traffic may be routed through local breakout.

As shown, if the application needs more than low QoS, at 530, whether mobility service(s) is needed may be determined. In an example where an application does not require mobility services such as video streaming or VOW, at 570, a local IP address may be assigned as a source IP address, and outgoing traffic may be routed through local breakout. If the application needs mobility services to function, at 540, whether the destination IP address is local may be determined. For example, if the IP address of the correspondent node is an IP address belonging to the local network, at 570, a local IP address may be assigned as a source IP address, and outgoing traffic may be routed through local breakout.

As shown, in response to determining that the destination IP address is not local, whether the local connection is in a stable state may be determined at 550. In response to determining that the local connection is not in a stable state, at 580, a mobile IP address may be assigned. In response to determining that the local connection is in a stable state, at 560, whether the needed mobility service(s) is available on the stable local breakout may be determined. In response to determining that the mobility service(s) is available on the stable local breakout. 570, the local IP address may be assigned. In response to determining that the mobility services are unavailable on the stable local breakout, at 580, a mobile IP address may be assigned. A pre-existing tunnel may be used.

The techniques described herein may be applicable to local breakouts independently of the mobile core network type such as MCN using Dual Stack Mobile IP (DSMIP), or Proxy Mobile IP (PIMP)/GPRS Tunneling Protocol (GTP), with or without LIF support.

Although features and elements are described above in particular combinations, one of ordinary skill in the art will appreciate that each feature or element can be used alone or in any combination with the other program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement, a radio frequency transceiver for use in a WTRU, UE, terminal, base station, RNC, or any host computer.

What is claimed:

1. A method for a wireless transmit and receive unit (WTRU) to send an internet protocol (IP) traffic flow, the method comprising:
   while being connected to a mobile network and a local network, determining whether the IP traffic flow is associated with an application requiring a mobility service;
   based on a determination that the IP traffic flow is not associated with the application requiring the mobility service, determining to offload the IP traffic flow from the mobile network to the local network;
   based on a determination that the IP traffic flow is associated with the application requiring the mobility service, determining whether to offload the IP traffic flow from the mobile network to the local network based on a destination address of the IP traffic flow and a type of the local network, wherein the IP traffic flow is determined to be offloaded from the mobile network to the local network on a condition that the destination address is local and the type of the local network is indicative of the WTRU being substantially stationary;
   selecting an IP address for sending the IP traffic flow based on whether offloading the IP traffic flow from the mobile network to the local network is determined; and
   sending the IP traffic flow using the selected IP address.

2. The method of claim 1, wherein the IP traffic flow is determined to be offloaded to the local network on a condition that the destination address is local and the local network is at least one of: an enterprise network or a residential network.

3. The method of claim 1, wherein the IP traffic flow is determined to be offloaded from the mobile network to the local network on a condition that the destination address is local and a local connection associated with the local network is stable.

4. The method of claim 1, wherein whether to offload the IP traffic flow is determined based on a filter rule indicating that traffic shall be non-seamlessly offloaded to the local network when the destination address is local.

5. The method of claim 1, wherein a local IP address allocated by the local network is selected for sending the IP traffic flow based on a determination to offload the IP traffic flow from the mobile network to the local network.

6. The method of claim 1, wherein a mobile IP address is selected for sending the IP traffic flow based on a determination to not offload the IP traffic flow from the mobile network to the local network.

7. The method of claim 1, further comprising:
   identifying a stability period of the local network, wherein the IP traffic flow is determined to be offloaded from the mobile network to the local network on a condition that the IP traffic flow is sent during the stability period of the local network.

8. A wireless transmit and receive unit (WTRU) for sending an internet protocol (IP) traffic flow, the WTRU comprising:
   a processor; and
   a memory comprising instructions that when executed by the processor cause the WTRU to:
      while being connected to a mobile network and a local network, determine whether the IP traffic flow is associated with an application requiring a mobility service;
      based on a determination that the IP traffic flow is not associated with the application requiring the mobility service, determine to offload the IP traffic flow from the mobile network to the local network;
      based on a determination that the IP traffic flow is associated with the application requiring the mobility service, determine whether to offload the IP traffic flow from the mobile network to the local network based on a destination address of the IP traffic flow and a type of the local network, wherein the IP traffic flow is determined to be offloaded from the mobile network to the local network on a condition that the destination address is local and the type of the local network is indicative of the WTRU being substantially stationary;
   select an IP address for sending the IP traffic flow based on whether offloading the IP traffic flow from the mobile network to the local network is determined; and
   send the IP traffic flow using the selected IP address.

9. The WTRU of claim 8, wherein the memory comprises further instructions that when executed by the processor cause the WTRUs to determine to offload IP traffic flow from the mobile network to the local network on a condition that the destination address is local and the local network is at least one of: an enterprise network or a residential network.

10. The WTRU of claim 8, wherein the memory comprises further instructions that when executed by the processor cause the WTRU to determine to offload IP traffic flow from the mobile network to the local network on a condition that the destination address is local and a local connection associated with the local network is stable.

11. The WTRU of claim 8, wherein whether to offload the IP traffic flow is determined based on a filter rule indicating that traffic shall be non-seamlessly offloaded to the local network when the destination address is local.

12. The WTRU of claim 8, wherein the memory comprises further instructions that when executed by the processor cause the WTRU to select a local IP address allocated by the local network for sending the IP traffic flow based on a determination to offload the IP traffic flow from the mobile network to the local network.

13. The WTRU of claim 8, wherein the memory comprises further instructions that when executed by the processor cause the WTRU to select a mobile IP address for sending the IP traffic flow based on a determination to not offload the IP traffic flow from the mobile network to the local network.

14. The WTRU of claim 8, further comprising a memory for storing stability information associated with the local network, the stability information comprising a stability period of the local network, wherein the IP traffic flow is determined to be offloaded from the mobile network to the local network on a condition that the IP traffic flow is sent during the stability period.

* * * * *